(12) United States Patent
Ozawa et al.

(10) Patent No.: US 7,960,946 B2
(45) Date of Patent: Jun. 14, 2011

(54) POWER SUPPLY CIRCUIT, POWER SUPPLY CONTROL CIRCUIT, AND POWER SUPPLY CONTROL METHOD

(75) Inventors: Hidekiyo Ozawa, Kasugai (JP); Toru Nakamura, Kasugai (JP)

(73) Assignee: Fujitsu Semiconductor Limited, Yokohama (JP)

( * ) Notice: Subject to any disclaimer, the term of this patent is extended or adjusted under 35 U.S.C. 154(b) by 87 days.

(21) Appl. No.: 12/032,237

(22) Filed: Feb. 15, 2008

(65) Prior Publication Data
US 2008/0197814 A1    Aug. 21, 2008

(30) Foreign Application Priority Data
Feb. 16, 2007    (JP) ................. 2007-035987

(51) Int. Cl.
*H02J 7/00*    (2006.01)
(52) U.S. Cl. .............. 320/153; 320/152; 320/164
(58) Field of Classification Search .............. 320/152, 320/163, 164
See application file for complete search history.

(56) References Cited

U.S. PATENT DOCUMENTS

| | | | | |
|---|---|---|---|---|
| 5,703,468 A | * | 12/1997 | Petrillo | 320/101 |
| 5,731,686 A | * | 3/1998 | Malhi | 320/154 |
| 6,133,712 A | | 10/2000 | Yeon | |
| 7,598,710 B2 | * | 10/2009 | Zhang | 320/137 |
| 2005/0275379 A1 | * | 12/2005 | Tsukamoto et al. | 320/134 |
| 2008/0094865 A1 | * | 4/2008 | So et al. | 363/49 |

FOREIGN PATENT DOCUMENTS

| | | |
|---|---|---|
| JP | 05-207671 A | 8/1993 |
| JP | 05-227677 A | 9/1993 |
| JP | 06-165408 A | 6/1994 |
| JP | 06-284593 A | 10/1994 |
| JP | 08-033230 A | 2/1996 |
| JP | 10-032475 A | 2/1998 |
| JP | 11-150885 A | 6/1999 |
| JP | 2001-211562 A | 8/2001 |
| JP | 2005-274372 A | 10/2005 |
| KR | 10-0271094 B1 | 11/2000 |

\* cited by examiner

*Primary Examiner* — Edward Tso
*Assistant Examiner* — Ramy Ramadan
(74) *Attorney, Agent, or Firm* — Arent Fox LLP

(57) ABSTRACT

A power supply circuit charging a secondary battery by a DC-DC converter using a switching element and an inductance element includes a current adjustment circuit. The current adjustment circuit adjusts a charging current of the secondary battery by turning on/off the switching element according to a voltage difference of a lower one of a reference voltage and a first control voltage corresponding to a temperature of the secondary battery from a current detection voltage corresponding to the charging current of the secondary battery.

20 Claims, 11 Drawing Sheets

US 7,960,946 B2

POWER SUPPLY CIRCUIT, POWER SUPPLY CONTROL CIRCUIT, AND POWER SUPPLY CONTROL METHOD

CROSS REFERENCE TO RELATED APPLICATION

This application is based upon and claims the benefit of priority from Japanese Patent Application No. 2007-035987, filed on Feb. 16, 2007, the entire contents of which is incorporated herein by reference.

BACKGROUND

1. Field

The embodiments relate to a power supply circuit, a power supply control circuit, and a power supply control method.

2. Description of the Related Art

In a portable electronics device such as a notebook-type personal computer, a secondary battery is mounted as a power source, and a charging circuit is also often mounted in the device so that the secondary battery can be easily charged when an external power source is coupled via an AC adapter or the like. Further, generally, the portable electronics device is driven by using power supply from the secondary battery when the external power source is not coupled, and is driven by using power supply from the external power source when the external power source is coupled.

In the portable electronics device, the secondary battery is charged by a constant voltage and a constant current applied to the secondary battery from the charging circuit using a DC-DC converter. The secondary battery generates heat when charged and discharged but is very sensitive to temperature, and thus rapidly deteriorates if charged when its temperature is beyond a tolerable range. Therefore, a conventional charging circuit monitors the temperature of the secondary battery and stops charging the secondary battery when the temperature of the secondary battery is beyond the tolerable range.

FIG. 1 illustrates a conventional charging circuit. FIG. 2 and FIG. 3 illustrate the operation of a PWM comparator in FIG. 1. FIG. 4 illustrates temperature characteristics of a thermistor in FIG. 1. FIG. 5 illustrates temperature characteristics of a voltage supplied to a window comparator in FIG. 1. A conventional charging circuit CHG uses a DC-DC converter of a PWM control method and has a main switching transistor T1, a synchronous rectification transistor T2, a choke coil L1, a smoothing capacitor C1, a current measurement resistor RS, and a control circuit CTL.

The main switching transistor T1 is formed by an n-type transistor. An input pin of the main switching transistor T1 is coupled to a pin P1 for receiving an input voltage Vi. An output pin of the main switching transistor T1 is coupled to one end of the choke coil L1. A control pin of the main switching transistor T1 receives an output signal Q1 of a PWM comparator PCMP in the control circuit CTL. The synchronous rectification transistor T2 is formed by an n-type transistor. An input pin of the synchronous rectification transistor T2 is coupled to a ground line. An output pin of the synchronous rectification transistor T2 is coupled to the one end of the choke coil L1. A control pin of the synchronous rectification transistor T2 receives an output signal /Q1a of a gate circuit G2 in the control circuit CLT. The other end of the choke coil L1 is coupled to one end of the smoothing capacitor C1 and one end of the current measurement resistor RS. The other end of the current measurement resistor RS is coupled to a ground line. The other end of the current measurement resistor RS is coupled to a pin P2 for supplying an output voltage Vo to a secondary battery BTR.

The control circuit CTL includes a voltage amplifier AMP, voltage generators E1, E2, error amplifiers ERA1, ERA2, resistors R1 to R3, an n-type transistor T3, a triangular wave oscillator OSC, the PWM comparator PCMP, gate circuits G1, G2, and a window comparator WCMP. The voltage amplifier AMP receives, at a non-inverting input pin, a voltage of the one end of the current measurement resistor RS, and receives, at an inverting input pin, a voltage of the other end of the current measurement resistor RS (output voltage Vo). With this structure, the voltage amplifier AMP amplifies a voltage difference between the voltage of the one end of the current measurement resistor RS and the voltage of the other end of the current measurement resistor RS to generate a voltage Vc. Therefore, the voltage Vc generated by the voltage amplifier AMP corresponds to an output current of the charging circuit CHG (charging current of the secondary battery BTR).

The voltage generator E1 generates a reference voltage Ve1. The error amplifier ERA1 receives the reference voltage Ve1 at a non-inverting input pin and receives the voltage Vc at an inverting input pin. Consequently, the error amplifier ERA1 amplifiers a voltage difference between the reference voltage Ve1 and the voltage Vc to generate an output signal DF1. The voltage generator E2 generates a reference voltage Ve2. The resistors R1, R2 and the transistor T3 are coupled in series between the pin P2 and the ground line. A control pin of the transistor T3 receives a stop signal /STP supplied from the gate circuit G1. The error amplifier ERA2 receives the reference voltage Ve2 at a non-inverting input pin and receives, at an inverting input pin, a voltage of a coupling node of the resistors R1, R2 (a voltage resulting from the division of the output voltage Vo by the resistors R1, R2 and the transistor T3). Consequently, the error amplifier ERA2 amplifies a voltage difference between the reference voltage Ve2 and the voltage of the coupling node of the resistors R1, R2 to generate an output signal DF2. The triangular wave oscillator OSC generates a triangular wave signal TW with a predetermined period.

The PWM comparator PCMP is a voltage to pulse width converter which compares a lower one of a voltage of a first non-inverting input pin and a voltage of a second non-inverting input pin with a voltage of an inverting input pin, and sets the output signal Q1 (/Q1) high (low) when the voltage of the inverting input pin is lower, while setting the output signal Q1 (/Q1) low (high) when the voltage of the inverting input pin is higher. The PWM comparator PCMP receives the output signal DF1 of the error amplifier ERA1 at the first non-inverting input pin, receives the output signal DF2 of the error amplifier ERA2 at the second non-inverting pin, and receives the triangular wave signal TW at the inverting input pin.

Therefore, as illustrated in FIG. 2, in a case where the voltage of the output signal DF1 of the error amplifier ERA1 is lower than the voltage of the output signal DF2 of the error amplifier ERA2, the PWM comparator PCMP compares the voltage of the output signal DF1 of the error amplifier ERA1 and the voltage of the triangular wave signal TW, and sets the output signal Q1 high when the voltage of the output signal DF1 of the error amplifier ERA1 is higher than the voltage of the triangular wave signal TW, while setting the output signal Q1 low when the voltage of the output signal DF1 of the error amplifier ERA1 is lower than the voltage of the triangular wave signal TW.

Further, as illustrated in FIG. 3, in a case where the voltage of the output signal DF2 of the error amplifier ERA2 is lower than the voltage of the output signal DF1 of the error amplifier ERA1, the PWM comparator PCMP compares the voltage of the output signal DF2 of the error amplifier ERA2 and the voltage of the triangular wave signal TW, and sets the output signal Q1 high when the voltage of the output signal DF2 of the error amplifier ERA2 is higher than the voltage of the triangular wave signal TW, while setting the output signal Q1 low when the voltage of the output signal DF2 of the error amplifier ERA2 is lower than the voltage of the triangular wave signal TW.

The resistor R3 is coupled between a supply line of a pull-up voltage Vh and a pin P3. The pin P3 is coupled to one end of a temperature measurement thermistor Th in the secondary battery BTR. The other end of the thermistor Th is coupled to a ground line. The thermistor Th is a temperature-sensitive resistor element whose resistance value changes according to temperature, and has temperature characteristics as illustrated in FIG. 4. Since the constant voltage Vh is applied to a serial resistor formed by the resistor R3 and the thermistor Th, a voltage Vt1 of the pin P3 supplied to the window comparator WCMP has temperature characteristics as illustrated in FIG. 5.

The window comparator WCMP sets a stop signal STP1 low when the voltage Vt1 is higher than αV and lower than βV, while setting the stop signal STP1 high when the voltage Vt1 is lower than αV or the voltage Vt1 is higher than βV, where αV is a value that the voltage Vt1 has when the temperature of the secondary battery BTR is the highest temperature in the tolerable range and βV is a value that the voltage Vt1 has when the temperature of the secondary battery BTR is the lowest temperature in the tolerable range.

The gate circuit G1 sets the stop signal /STP low when at least one of stop signals STP1, STP2 is set high, while setting the stop signal /STP high when the stop signals STP1, STP2 are both set low. The stop signal STP2 is a signal for requesting activation/stop of the charging circuit CHG, and is set high when the stop of the charging circuit CHG is requested, while being set low when the activation of the charge circuit CHG is requested. When the stop signal /STP is set high, the gate circuit G2 supplies the control pin of the synchronous rectification transistor T2 with the output signal /Q1 of the PWM comparator PCMP as the output signal /Q1a, and when the stop signal /STP is set low, the gate circuit G2 supplies the control pin of the synchronous rectification transistor T2 with the low level signal as the output signal /Q1a.

In the charging circuit CHG as described above, when the main switching transistor T1 turns on, the synchronous rectification transistor T2 turns off, so that a current is supplied from an input side to a load via the choke coil L1. Since a voltage difference between the input voltage Vi and the output voltage Vo is applied to the both ends of the choke coil L1, a current flowing through the choke coil L1 increases with time, and the current supplied to the load also increases with time. Further, energy is accumulated in the choke coil L1 when the current flows through the choke coil L1.

Then, when the main switching transistor T1 turns off, the synchronous rectification transistor T2 turns on, so that the energy accumulated in the choke coil L1 is discharged. At this time, the output voltage Vo is expressed by an equation (1) using an ON period Ton of the main switching transistor T1, an OFF period Toff of the main switching transistor T1, and the input voltage Vi.

$$Vo=\{Ton/(Ton+Toff)\} \times Vi \qquad (1)$$

Further, the current flowing through the choke coil L1 flows from the input side to an output side during the ON period of the main switching transistor T1, while supplied via the synchronous rectification transistor T2 during the OFF period of the main switching transistor T1. Therefore, an average input current Ii is expressed by an equation (2) using the ON period Ton of the main switching transistor T1, the OFF period Toff of the main switching transistor T1, and an output current Io.

$$Ii=\{Ton/(Ton+Toff)\} \times Io \qquad (2)$$

Therefore, if the output voltage Vo varies due to the variation of the input voltage Vi, it is possible to keep the output voltage Vo constant by controlling a ratio of the ON period/OFF period of the main switching transistor T1 based on the detected variation of the output voltage Vo. Similarly, if the output voltage Vo varies due to the variation of the load, it is also possible to keep the output voltage Vo constant by controlling the ratio of the ON period/OFF period of the main switching transistor T1 based on the detected variation of the output voltage Vo.

Further, in the charging circuit CHG, in accordance with an increase in a load current, a current flowing through the current measurement resistor RS increases, and a voltage decrease occurring at the both ends of the current measurement resistor RS becomes great. The great voltage decrease occurring at the both ends of the current measurement resistor RS results in a small voltage difference between the voltage of the non-inverting input pin and the voltage of the inverting input pin in the error amplifier ERA1, so that the voltage of the output signal DF1 of the error amplifier ERA1 lowers. As a result, since a pulse width (high-level period) of the output signal Q1 of the PWM comparator PCMP reduces, the output voltage Vo lowers, resulting in a decreased charging current of the secondary battery BTR.

On the other hand, if the load current decreases, the current flowing through the current measurement resistor RS decreases, and a voltage decrease occurring at the both ends of the current measurement resistor RS becomes small. The small voltage decrease occurring at the both ends of the current measurement resistor RS results in a large voltage difference between the voltage of the non-inverting input pin and the voltage of the inverting input pin in the error amplifier ERA1, so that the voltage of the output signal DF1 of the error amplifier ERA1 increases. As a result, since the pulse width of the output signal Q1 of the PWM comparator PCMP increases, the output voltage Vo increases, resulting in an increased charging current of the secondary battery BTR. In this manner, in the charging circuit CHG using the DC-DC converter of the PWM control method, controlling the output voltage Vo by controlling the ratio of the ON period/OFF period of the main switching transistor T1 makes it possible to control a charging current and a charging voltage of the secondary battery BTR.

Further, in the charging circuit CHG, when the temperature of the secondary battery BTR is higher than the highest temperature in the tolerable range, the stop signal STP1 supplied from the window comparator WCMP is set high since the voltage Vt1 becomes lower than αV. Consequently, the stop signal /STP supplied from the gate circuit G1 is set low, so that the charging circuit CHG stops and the charging of the secondary battery BTR is stopped. Similarly, when the temperature of the secondary battery BTR is lower than the lowest temperature in the tolerable range, the stop signal STP1 is set high since the voltage Vt1 becomes higher than βV. Consequently, the stop signal /STP is set low, so that the charging circuit CHG stops and the charging of the secondary battery BTR is stopped.

When the charging circuit CHG is in a stopped state, the stop signal /STP supplied from the gate circuit G1 is set low, and consequently, the output signal /Q1a of the gate circuit G2 is set low to turn off the synchronous rectification transistor T2, which prevents the secondary battery BTR from being discharged via the synchronous rectification transistor T2. Similarly, when the charging circuit CHG is in the stopped state, the stop signal /STP is set low, and consequently, the transistor T3 turns off, which prevents the secondary battery BTR from being discharged via the resistors R1, R2 and the transistor T3.

Incidentally, related arts include Japanese Unexamined Patent Application Publication No. H08-33230, Japanese Unexamined Patent Application Publication No. H05-207671, Japanese Unexamined Patent Application Publication No. H05-227677, Japanese Unexamined Patent Application Publication No. H06-165408, Japanese Unexamined Patent Application Publication No. H10-32475, Japanese Unexamined Patent Application Publication No. H11-150885, Japanese Unexamined Patent Application Publication No. 2001-211562, Japanese Unexamined Patent Application Publication No. H06-284593, Japanese Unexamined Patent Application Publication No. 2005-274372, and so on.

The conventional charging circuit is structured to stop charging the secondary battery when the temperature of the secondary battery is beyond the tolerable range. This causes the following situations. That is, immediately after the secondary battery is discharged, the temperature of the secondary battery is relatively high. If the charging of the secondary battery is started in this state, the charging of the secondary battery is stopped immediately due to the high temperature, and the charging of the secondary battery is kept stopped until the temperature of the secondary battery lowers to a temperature within the tolerable range. Further, immediately after the portable electronics device is driven by using the power supply from the secondary battery, the temperature of the secondary battery is relatively high. Therefore, if the charging of the secondary battery is started in this state, the temperature of the secondary battery quickly increases up to a temperature beyond the tolerable range, and in some cases, the start and stop of the charging of the secondary battery are frequently repeated until the temperature of the portable electronics device sufficiently decreases.

SUMMARY

A power supply circuit (a power supply control circuit applied in the power supply circuit) charging a secondary battery by a DC-DC converter using a switching element and an inductance element includes a current adjustment circuit. The current adjustment circuit adjusts a charging current of the secondary battery by turning on/off the switching element according to a voltage difference of a lower one of a reference voltage and a first control voltage corresponding to a temperature of the secondary battery from a current detection voltage corresponding to the charging current of the secondary battery (current adjustment operation).

DETAILED DESCRIPTION OF THE EMBODIMENTS

Figure 1:
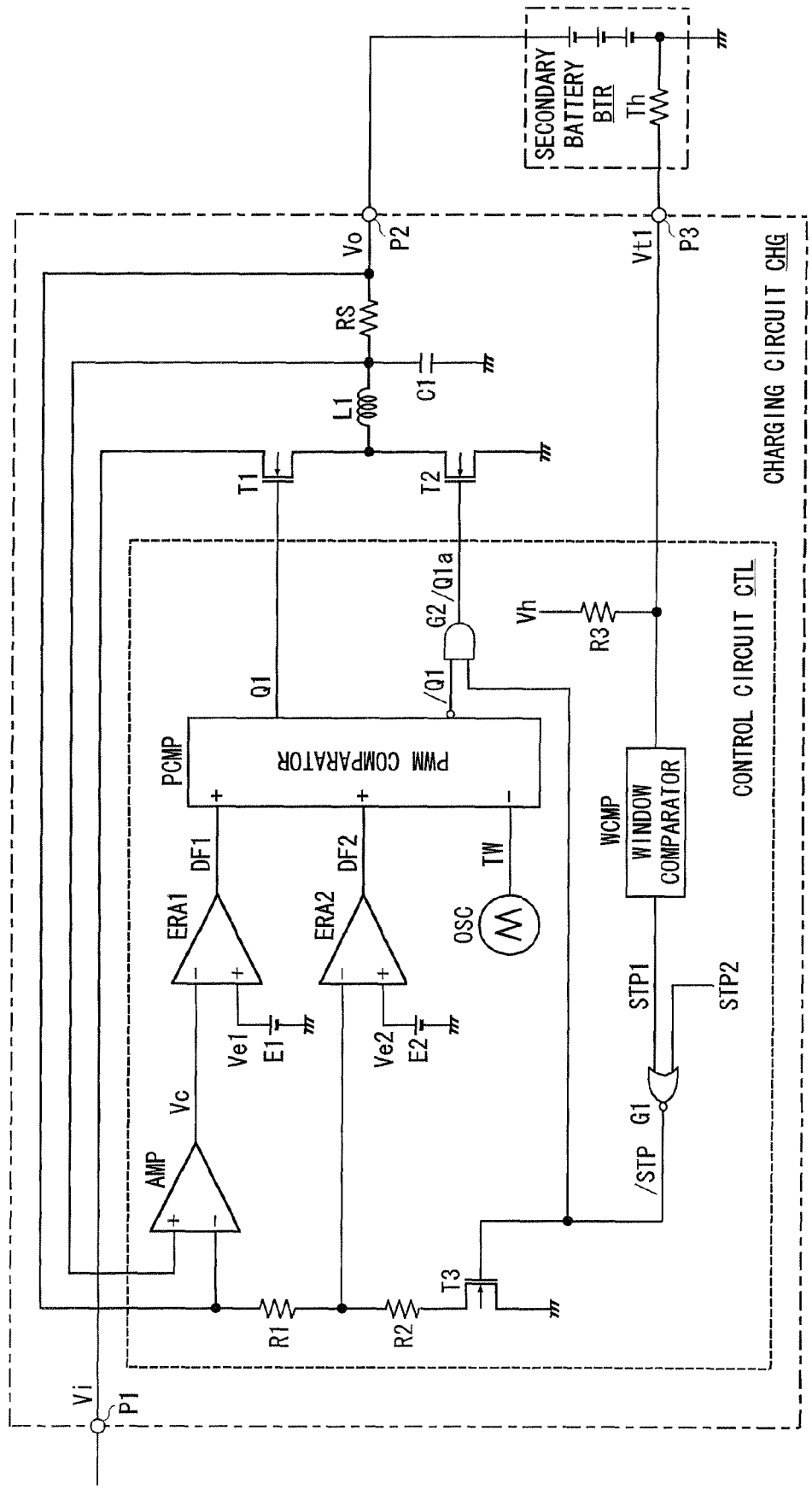
FIG. 1 is an explanatory diagram illustrating a conventional charging circuit.
Figure 2:
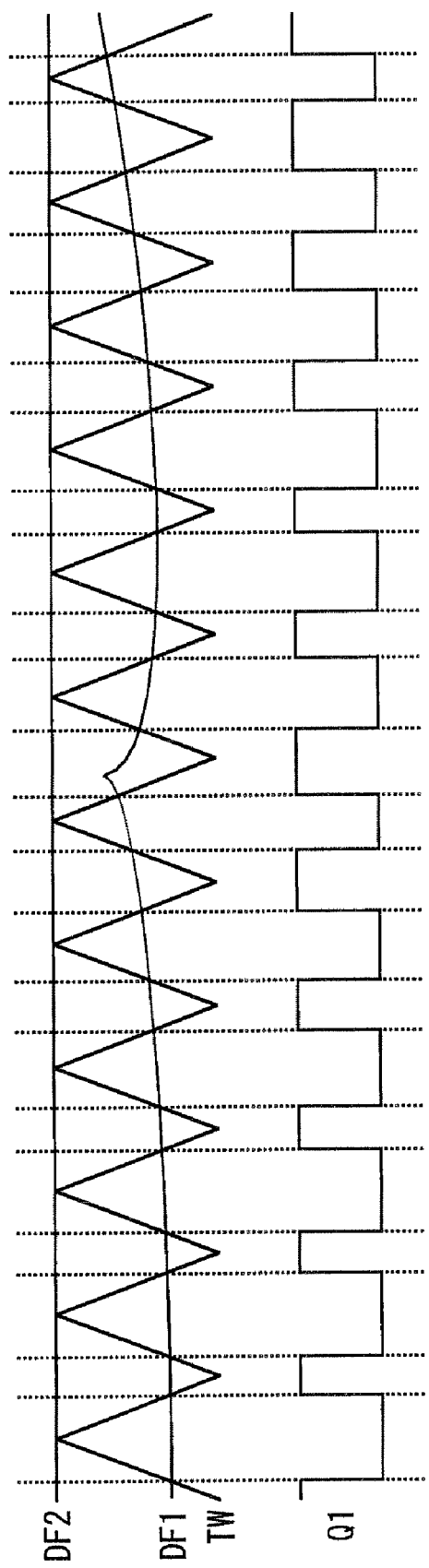
FIG. 2 is an explanatory chart (No. 1) illustrating the operation of a PWM comparator in FIG. 1.
Figure 3:
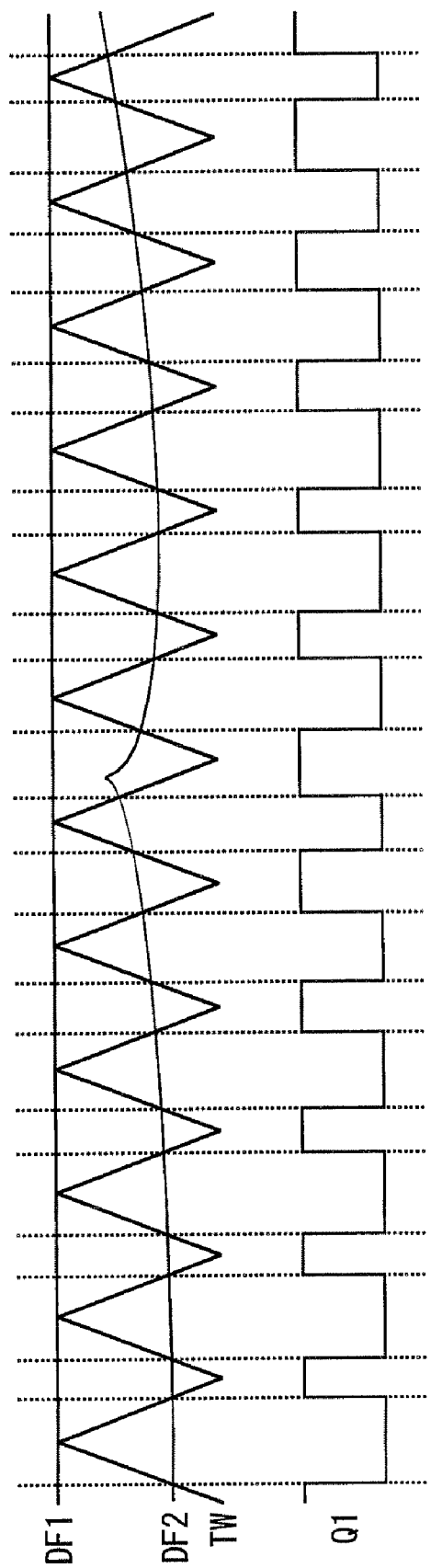
FIG. 3 is an explanatory chart (No. 2) illustrating the operation of the PWM comparator in FIG. 1.
Figure 4:
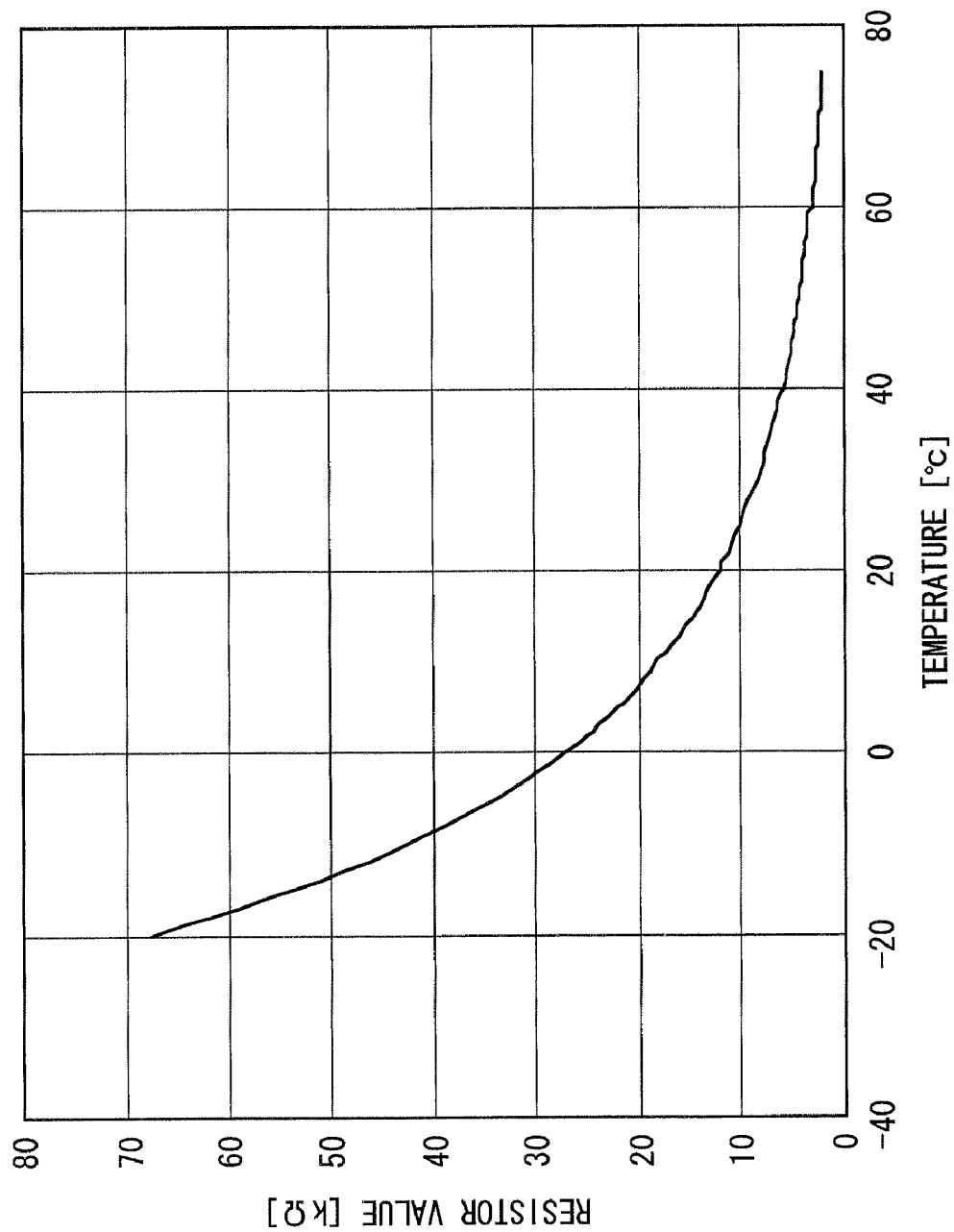
FIG. 4 is an explanatory chart illustrating temperature characteristics of a thermistor in FIG. 1.

According to an aspect of one embodiment, since the current adjustment circuit is provided, the charging current of the secondary battery can be decreased as the temperature of the secondary battery increases. Since a temperature increase rate of the secondary battery greatly depends on the charging current, it is possible to suppress the temperature increase accompanying the charging of the secondary battery, which makes it possible to charge the secondary battery in a relatively high temperature state.

For example, the current adjustment circuit uses, in addition to the reference voltage and the first control voltage, a second control voltage corresponding to a temperature of the power supply circuit and a third control voltage which is set to one of a voltage higher than the reference voltage and a voltage lower than the reference voltage according to a charging voltage of the secondary battery, and turns on/off the switching element according to a voltage difference of a lowest one of the reference voltage and the first to third control voltages from the current detection voltage.

The power supply circuit itself also generates heat while charging the secondary battery, and since the power supply circuit is generally disposed near the secondary battery, the temperature of the secondary battery increases due to the influence of heat caused by the heat generation of the power supply circuit. Therefore, by additionally using the second control voltage, the current adjustment circuit can adjust the charging current of the secondary battery with high precision. Further, the additional use of the third control voltage by the current adjustment circuit enables the power supply circuit to have output characteristics such that the charging current of the secondary battery is set small when the charging voltage of the secondary battery is lower than a predetermined voltage and the charging current of the secondary battery is set large when the charging voltage of the secondary battery is higher than the predetermined voltage.

For example, the power supply circuit (power supply control circuit) further includes a non-linear conversion circuit. The non-linear conversion circuit non-linearly converts the first control voltage according to a predetermined conversion rule to generate a first converted control voltage (non-linear conversion operation). The current adjustment circuit uses the first converted control voltage instead of the first control voltage. Providing the non-linear conversion circuit makes it possible to set the charging current of the secondary battery to a current value other than a current value determined depending on the first control voltage, which contributes to improvement in convenience of the power supply circuit.

For example, the voltage generated by the non-linear conversion circuit is set lower than the reference voltage. The current adjustment circuit excludes the reference voltage from voltages to be used. This can simplify the current adjustment circuit, realizing a reduced circuit scale of the power supply circuit. For example, the non-linear conversion circuit generates a second and a third converted control voltage by non-linearly converting a second control voltage corresponding to a temperature of the power supply circuit and a charging voltage of the secondary battery according to a predetermined conversion rule. The current adjustment circuit uses the second and third converted control voltages in addition to the first converted control voltage, and turns on/off the switching element according to a voltage difference of a lowest one of the first to third converted control voltages from the current detection voltage.

By using the second converted control voltage, the current adjustment circuit can adjust the charging current of the secondary battery with high precision. In addition, it is possible to set the charging current of the secondary battery to a current value other than a current value determined depending on the second control voltage, which contributes to improvement in convenience of the power supply circuit. The additional use of the third converted control voltage by the current adjustment circuit enables the power supply circuit to have output characteristics such that that the charging current of the secondary battery is set small when the charging voltage of the secondary battery is lower than a predetermined voltage and the charging current of the secondary battery is set large when the charging voltage of the secondary battery is higher than the predetermined voltage.

For example, the non-linear conversion circuit includes a conversion rule changing circuit. The conversion rule changing circuit changes the conversion rule according to the secondary battery (conversion rule changing operation). For example, the conversion rule changing circuit changes the conversion rule by using a communication circuit communicating with an external device. Providing the conversion rule changing circuit makes it possible to adjust the charging current of the secondary battery according to the secondary battery with high precision.

Figure 6:
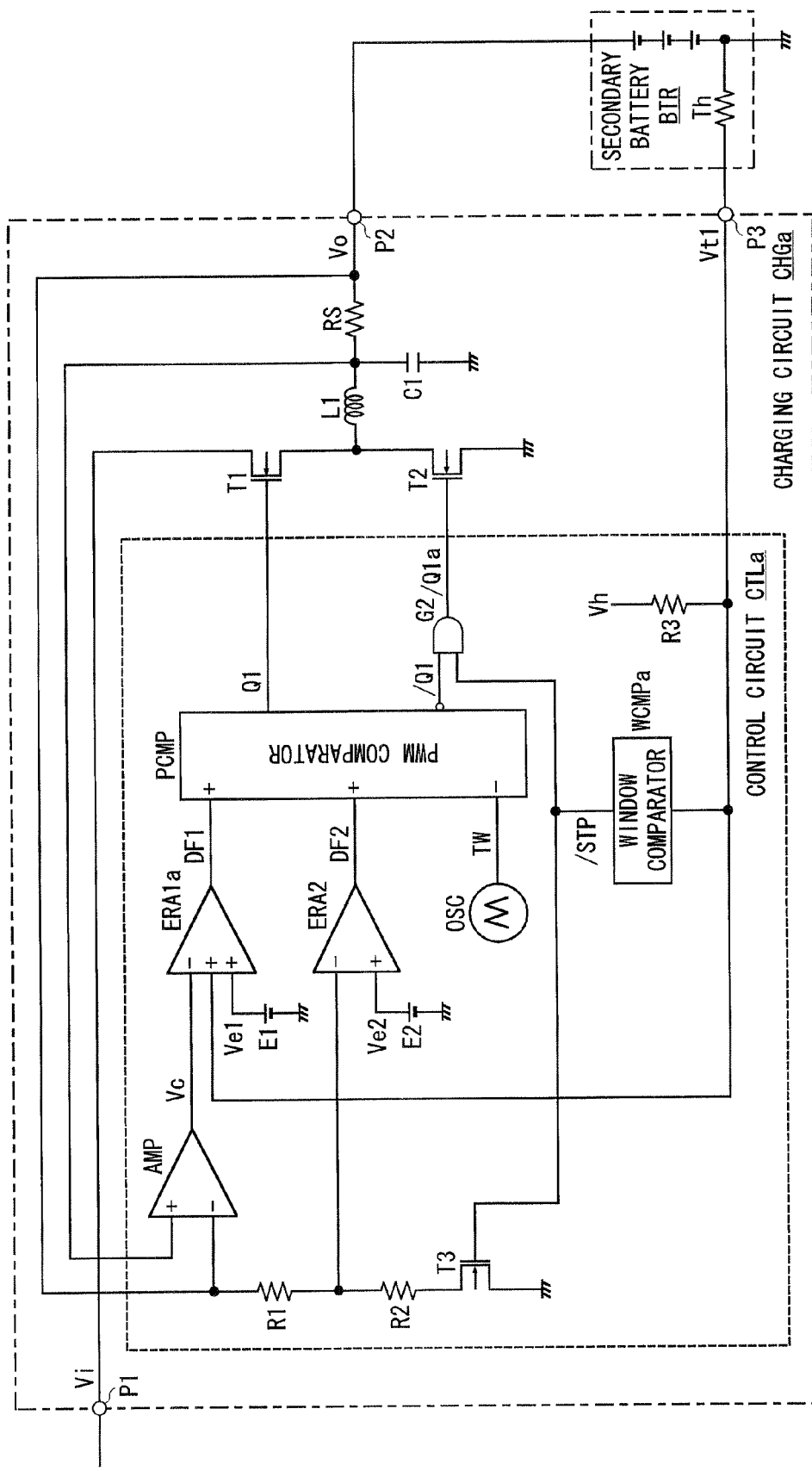
FIG. 6 is an explanatory diagram illustrating a first embodiment.

Hereinafter, embodiments will be described by using the drawings. FIG. 6 illustrates a first embodiment. Hereinafter, the first embodiment will be described, and the same reference numerals and symbols as those used in FIG. 1 are used to designate the same elements as the elements described in FIG. 1, and detailed description thereof will be omitted. A charging circuit CHGa of the first embodiment is structured such that in the charging circuit CHG in FIG. 1, the control circuit CTL is replaced by a control circuit CTLa. For example, the charging circuit CHGa is embodied by a semiconductor device and is mounted on a portable electronics device to be used for charging a secondary battery BTR. The control circuit CTLa is structured such that in the control circuit CTL, the gate circuit G1 is removed and the window comparator WCMP and the error amplifier ERA1 are replaced by a window comparator WCMPa and an error amplifier ERA1*a*.

The window comparator WCMPa sets a stop signal /STP high when a voltage Vt1 is higher than αV and lower than βV, while setting the stop signal /STP low when the voltage Vt1 is lower than αV or when the voltage Vt1 is higher than βV. The error amplifier ERA1*a* receives a reference voltage Ve1 at a first non-inverting input pin, receives the voltage Vt1 at a second non-inverting input pin, and receives a voltage Vc at an inverting input pin. The error amplifier ERA1*a* amplifies a voltage difference of a lower one of the voltage of the first non-inverting input pin and the voltage of the second non-inverting input pin from the voltage of the inverting input pin to generate an output signal DF1. Therefore, the error amplifier ERA1*a* amplifies a voltage difference between the reference voltage Ve1 and the voltage Vc to generate the output signal DF1 when the voltage Vt1 is higher than the reference voltage Ve1, and amplifies a voltage difference between the voltage Vt1 and the voltage Vc to generate the output signal DF1 when the voltage Vt1 is lower than the reference voltage Ve1.

Figure 5:
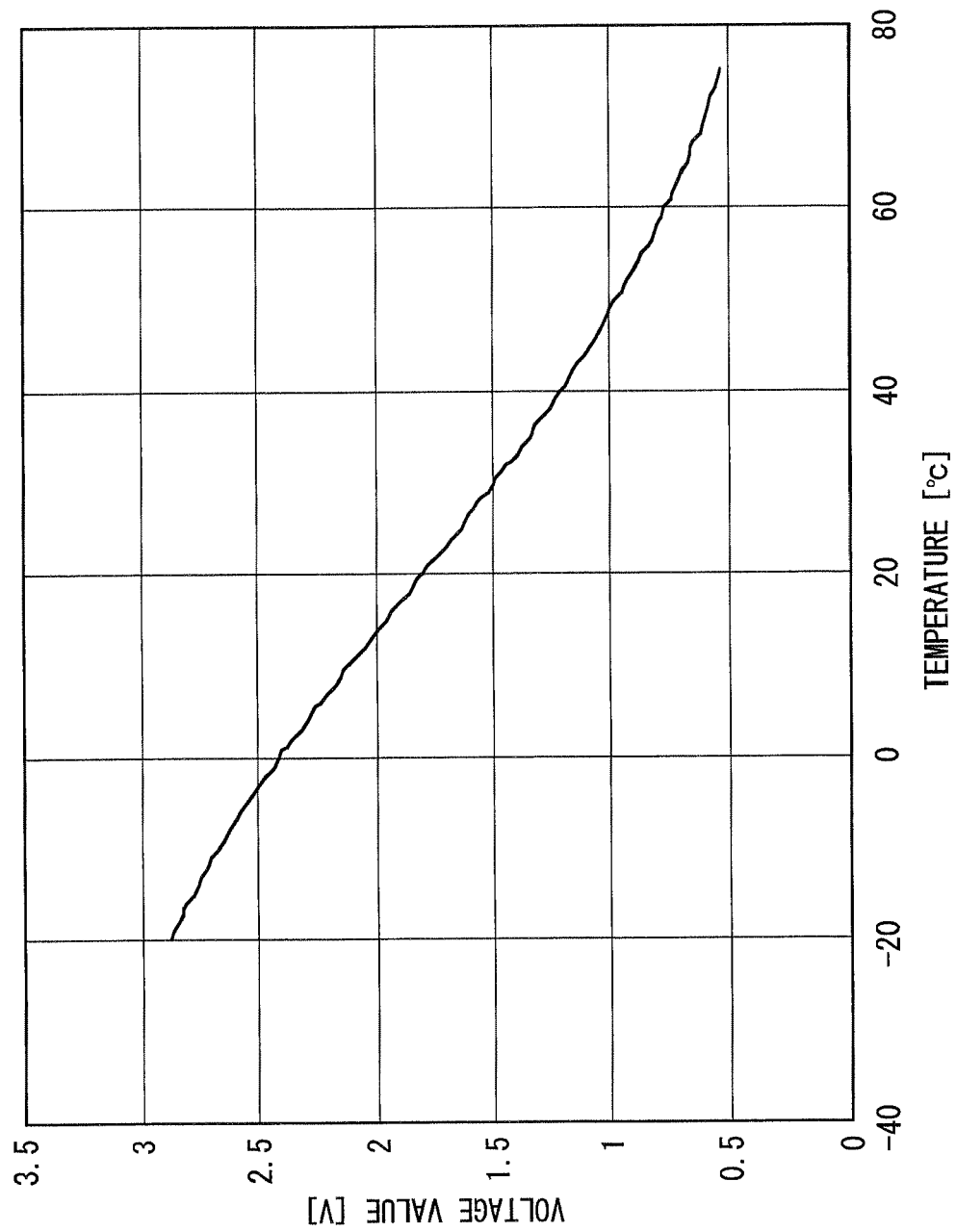
FIG. 5 is an explanatory chart illustrating temperature characteristic of a voltage supplied to a window comparator in FIG. 1.

The voltage Vt1 of a pin P3 supplied to the window comparator WCMPa has temperature characteristics that its voltage value decreases as a temperature of the secondary battery BTR increases as illustrated in FIG. 5. The temperature of the secondary battery BTR increases when it is charged and discharged, but since a temperature increase rate greatly depends on a charging current and a discharging current, the temperature increase rate lowers as the charging current and the discharging current decrease. In the first embodiment, the charging current of the secondary battery BTR is adjusted based on the reference voltage Ve1 when the temperature of the secondary battery BTR is low, but the charging current of the secondary battery BTR is adjusted based on the voltage Vt1 when the temperature of the secondary battery BTR increases. Therefore, the charging current of the secondary battery BTR can be decreased as the temperature of the secondary battery BTR is higher. Therefore, it is possible to prevent the secondary battery BTR from having a temperature beyond a tolerable range, which makes it possible to charge the secondary battery BTR in a relatively high-temperature state.

Figure 7:
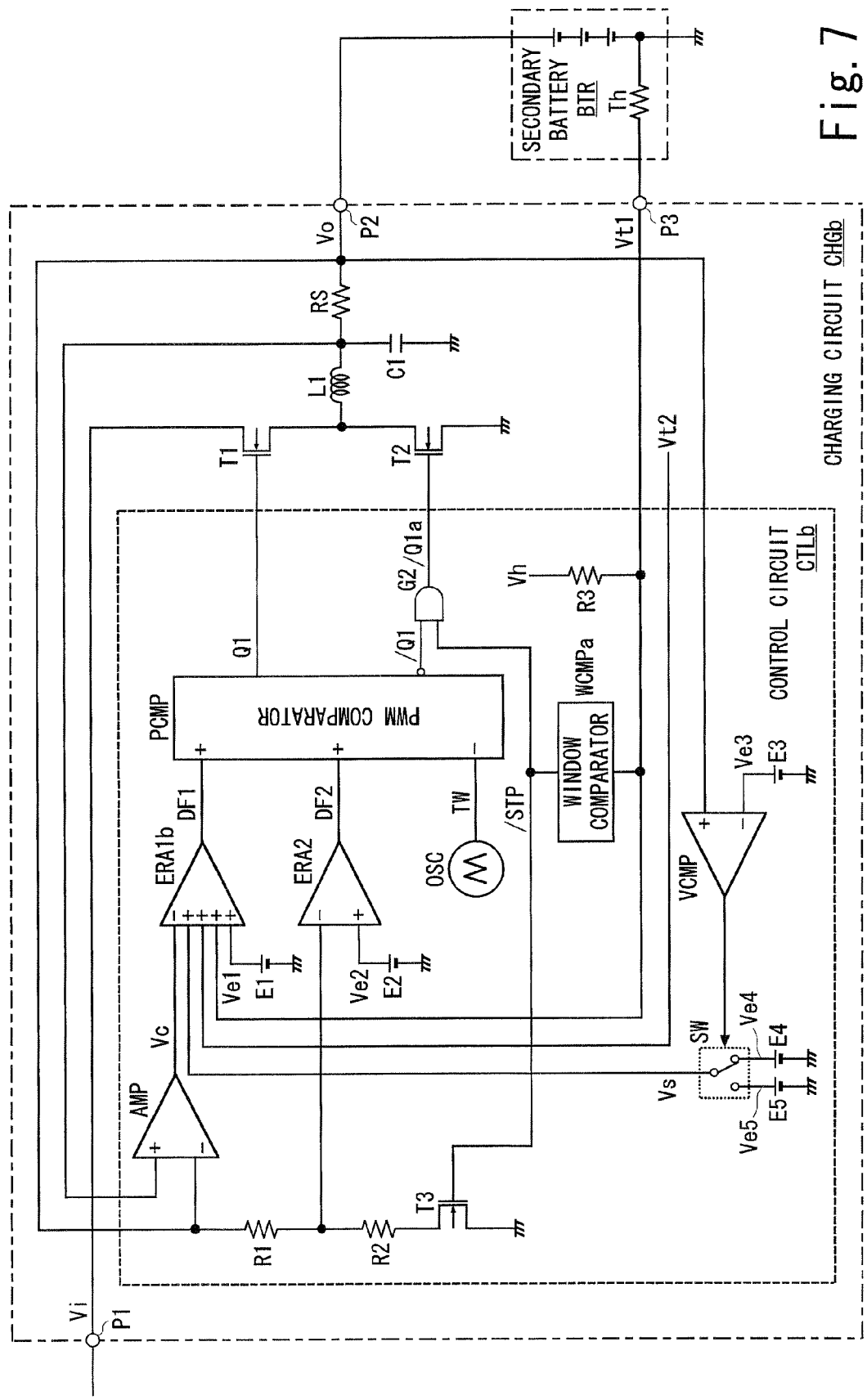
FIG. 7 is an explanatory diagram illustrating a second embodiment.
Figure 8:
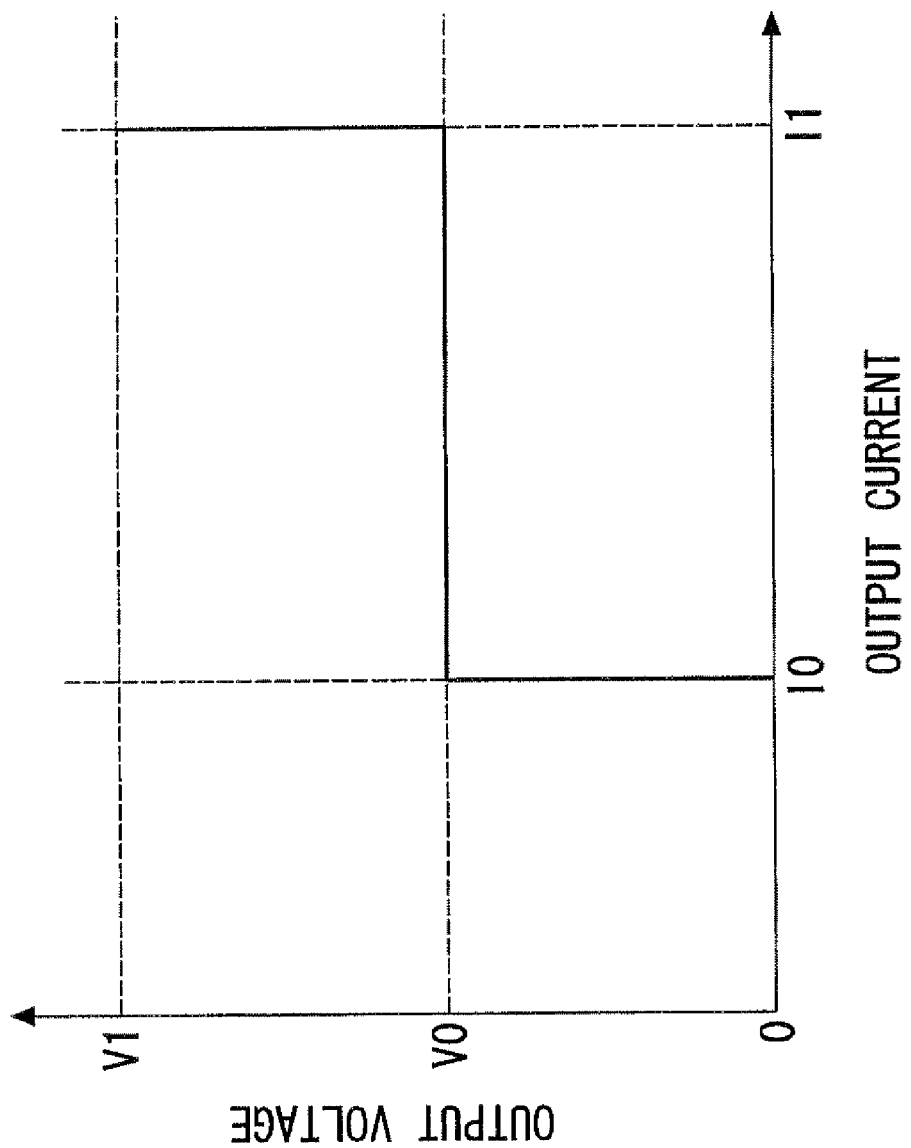
FIG. 8 is an explanatory chart illustrating output characteristics of a charging circuit of the second embodiment.

FIG. 7 illustrates a second embodiment. FIG. 8 illustrates output characteristics of a charging circuit of the second embodiment. Hereinafter, the second embodiment will be described, and the same reference numerals and symbols as those used in the first embodiment are used to designate the same elements as the elements described in the first embodiment, and detailed description thereof will be omitted. A charging circuit CHGb of the second embodiment is structured such that in the charging circuit CHGa of the first embodiment, the control circuit CTLa is replaced by a control circuit CTLb. For example, the charging circuit CHGb is embodied by a semiconductor device and is mounted on a portable electronics device to be used for charging a secondary battery BTR. The control circuit CTLb is structured such that in the control circuit CTLa, voltage generators E3 to E5, a voltage comparator VCMP, and a switch circuit SW are added, and the error amplifier ERA1*a* is replaced by an error amplifier ERA1*b*.

The voltage generator E3 generates a reference voltage Ve3. The voltage comparator VCMP receives an output voltage Vo (a charging voltage of the secondary battery BTR) at a non-inverting input pin and receives the reference voltage Ve3 at an inverting input pin. With this structure, the voltage comparator VCMP sets an output signal high when the charging voltage of the secondary battery BTR is higher than the reference voltage Ve3, while setting the output signal low when the charging voltage of the secondary battery BTR is lower than the reference voltage Ve3.

The voltage generator E4 generates a reference voltage Ve4 higher than the reference voltage Ve1. The voltage generator E5 generates a reference voltage Ve5 lower than the reference voltage Ve1. The switch circuit SW outputs the reference voltage Ve4 as a voltage Vs when the output signal of the voltage comparator VCMP is set high (when the charging voltage of the secondary battery BTR is higher than the reference voltage Ve3). On the other hand, the switch circuit SW outputs the reference voltage Ve5 as the voltage Vs when the output signal of the voltage comparator VCMP is set low (when the charging voltage of the secondary battery BTR is lower than the reference voltage Ve3).

The error amplifier ERA1b receives the reference voltage Ve1 at a first non-inverting input pin, receives a voltage Vt1 at a second non-inverting input pin, receives a voltage Vt2 at a third non-inverting input pin, receives the voltage Vs at a fourth non-inverting input pin, and receives a voltage Vc at an inverting input pin. The error amplifier ERA1b amplifies a voltage difference of the lowest one of the voltages of the first to fourth non-inverting input pins from the voltage of the inverting input pin to generate an output signal DF1. That is, the error amplifier ERA1b amplifies a voltage difference of the lowest one of the reference voltage Ve1, the voltage Vt1, the voltage Vt2, and the voltage Vs from the voltage Vc to generate the output signal DF1. Incidentally, the voltage Vt2 corresponds to a temperature of the charging circuit CHGb. A correlation between the voltage Vt2 and the temperature of the charging circuit CHGb is the same as a correlation between the voltage Vt1 and the temperature of the secondary battery BTR.

The second embodiment as described above can provide the same effects as those of the first embodiment. In addition, in the second embodiment, when the voltages Vt1, Vs and the reference voltage Ve1 are higher than the voltage Vt2, a charging current of the secondary battery BTR is adjusted based on the voltage Vt2 corresponding to the temperature of the charging circuit CHGb. This enables precise adjustment of the charging current of the secondary battery BTR. Further, in a case where the voltages Vt1, Vt2 are higher than the reference voltage Ve1, the charging current of the secondary battery BTR is adjusted based on the reference voltage Ve1 if the charging voltage of the secondary battery BTR is higher than the reference voltage Ve3, and the charging current of the secondary battery BTR is adjusted based on the reference voltage Ve5 lower than the reference voltage Ve1 if the charging voltage of the secondary battery BTR is lower than the reference voltage Ve3. Therefore, it is possible to realize output characteristics that the charging current of the secondary battery BTR (the output current of the charging circuit CHGb) becomes a current I0 when the charging voltage of the secondary battery BTR (the output voltage Vo of the charging circuit CHGb) is lower than a voltage V0, and the charging current of the secondary battery BTR becomes a current I1 when the charging voltage of the secondary battery BTR is higher than the voltage V0, as illustrated in FIG. 8.

Figure 9:
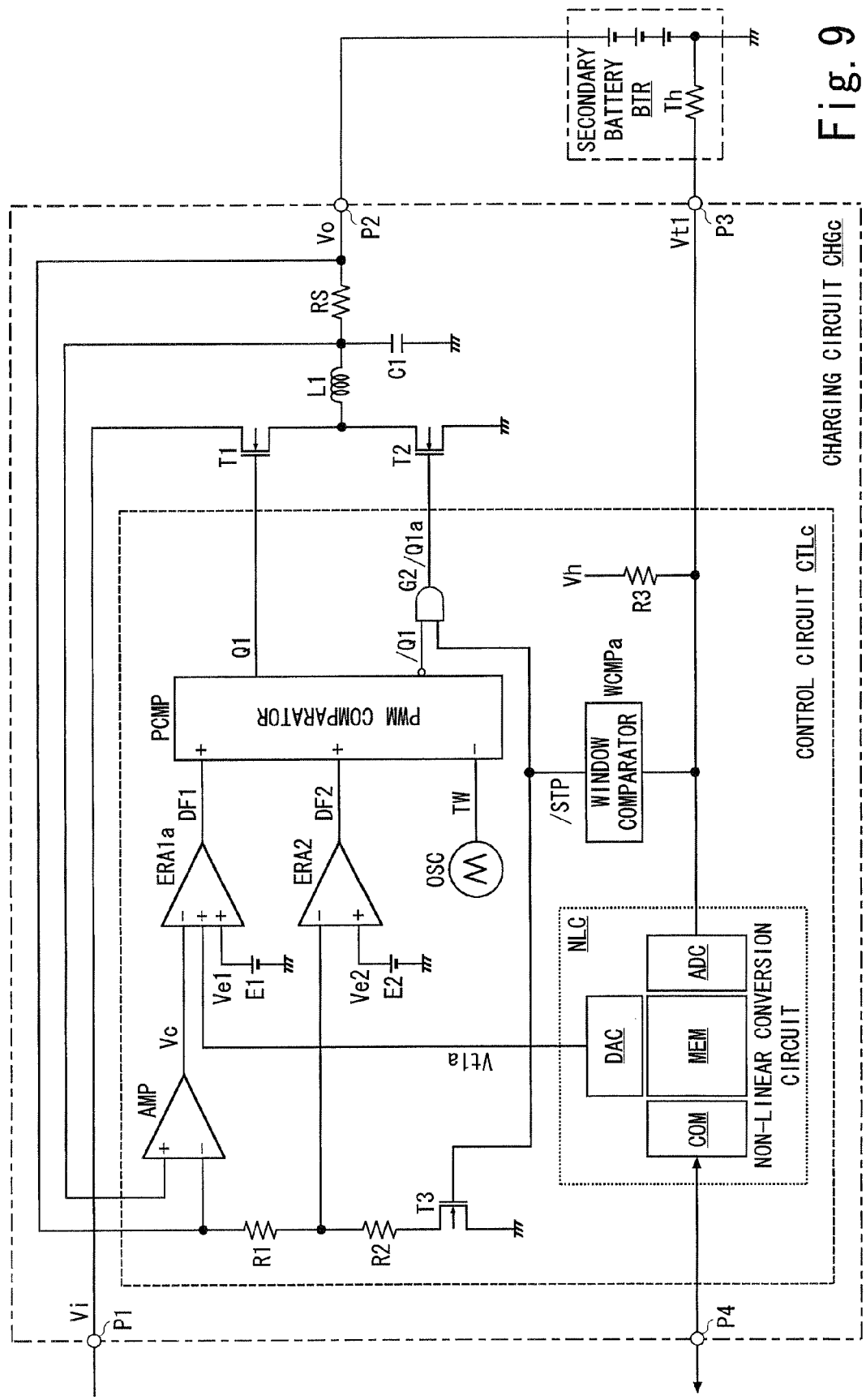
FIG. 9 is an explanatory diagram illustrating a third embodiment.

FIG. 9 illustrates a third embodiment. Hereinafter, the third embodiment will be described, and the same reference numerals and symbols as those used in the first embodiment are used to designate the same elements as the elements described in the first embodiment, and detailed description thereof will be omitted. A charging circuit CHGc of the third embodiment is structured such that in the charging circuit CHGa of the first embodiment, the control circuit CTLa is replaced by a control circuit CTLc. For example, the charging circuit CHGc is embodied by a semiconductor device and is mounted on a portable electronics device to be used for charging a secondary battery BTR. The control circuit CTLc is structured such that in the control circuit CTLa, a non-linear conversion circuit NLC is added.

The non-linear conversion circuit NLC includes an A/D converter ADC, a non-volatile memory MEM, a D/A converter DAC, and a communication circuit COM. The A/D converter ADC converts a voltage Vt1 to a digital value to supply the digital value to the non-volatile memory MEM. The non-volatile memory MEM receives, as an address, the digital value supplied from the A/D converter ADC, and reads the digital value stored in the address to supply the read digital value to the D/A converter DAC. The D/A converter DAC converts the digital value supplied from the non-volatile memory MEM to an analog voltage to supply the analog voltage as a voltage Vt1a to a second non-inverting input pin of an error amplifier ERA1a. The communication circuit COM, which is formed by using a serial interface circuit or the like (for example, IIC), is capable of communicating with an external device via a pin P4 and rewrites the digital value stored in the non-volatile memory MEM according to a request from the external device.

The third embodiment as described above can also provide the same effects as those of the first embodiment. In addition, in the third embodiment, a charging current of the secondary battery BTR is adjusted based on a reference voltage Ve1 when the voltage Vt1a supplied from the D/A converter DAC is higher than the reference voltage Ve1, and the charging current of the secondary battery BTR is adjusted based on the voltage Vt1a when the voltage Vt1a is lower than the reference voltage Ve1. Further, the digital value stored in the non-volatile memory MEM is rewritable from the external device via the communication circuit COM, which makes it possible to adjust the charging current of the secondary battery BTR according to characteristics of the secondary battery BTR. Therefore, as compared to the first embodiment where the charging current of the secondary battery BTR is settable only to a current value which depends on the temperature characteristics of the thermistor Th, it is possible to more greatly improve convenience.

Figure 10:
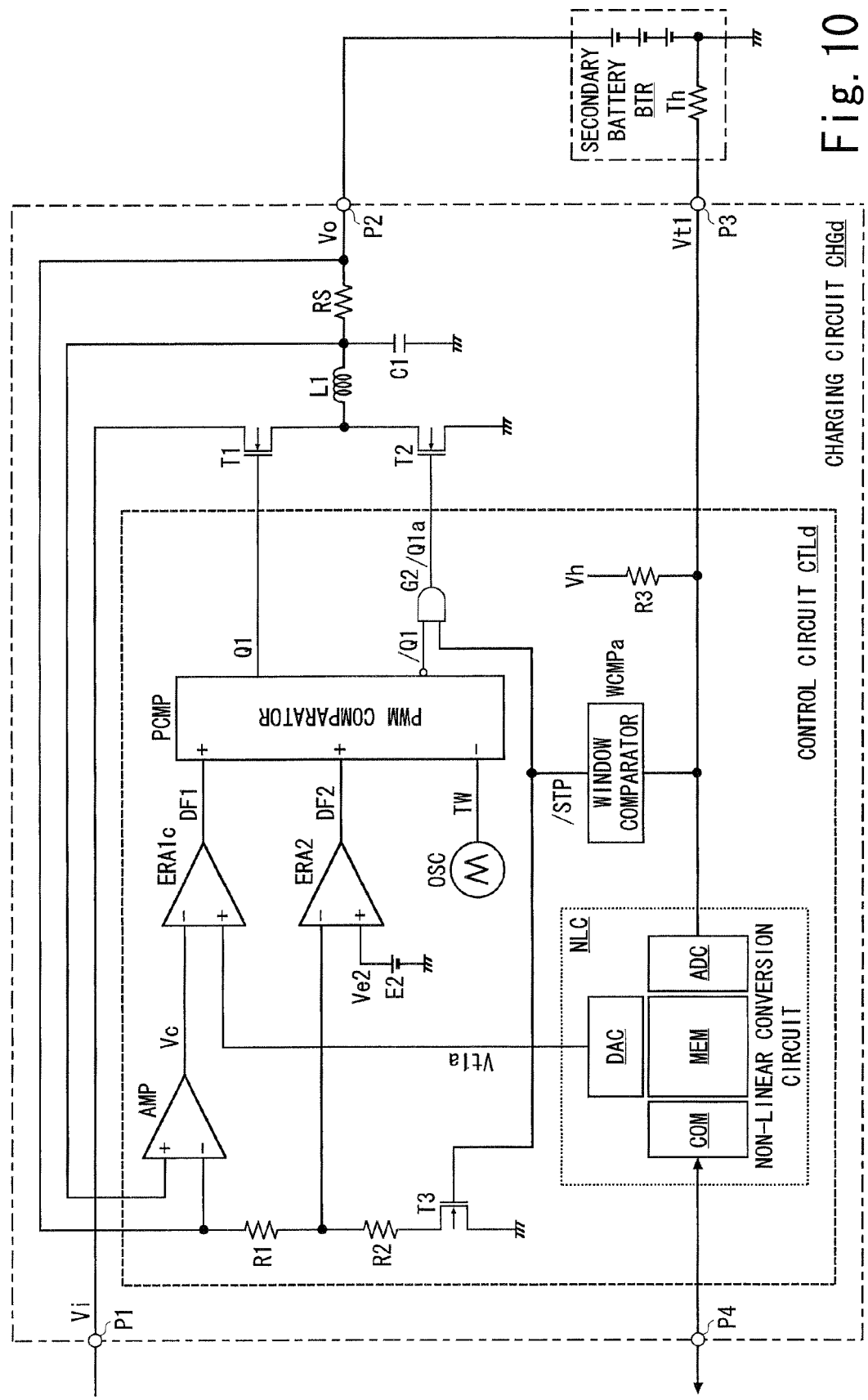
FIG. 10 is an explanatory diagram illustrating a fourth embodiment.

FIG. 10 illustrates a fourth embodiment. Hereinafter, the fourth embodiment will be described, and the same reference numerals and symbols as those used in the first and third embodiments are used to designate the same elements as the elements described in the first and third embodiments, and detailed description thereof will be omitted. A charging circuit CHGd of the fourth embodiment is structured such that in the charging circuit CHGc of the third embodiment, the control circuit CTLc is replaced by a control circuit CTLd. For example, the charging circuit CHGd is embodied by a semiconductor device and is mounted on a portable electronics device to be used for charging a secondary battery BTR. The control circuit CTLd is structured such that in the control circuit CTLc, the voltage generator E1 is removed and the error amplifier ERA1a is replaced by an error amplifier ERA1c.

The error amplifier ERA1c receives a voltage Vt1a at a non-inverting input pin and receives a voltage Vc at an inverting input pin. With this structure, the error amplifier ERA1c amplifies a voltage difference between the voltage Vt1a and the voltage Vc to generate an output signal DF1. Incidentally, in a non-linear conversion circuit NLC, a digital value stored in a non-volatile memory MEM is set so that the voltage Vt1a supplied from a D/A converter DAC becomes lower than the reference voltage Ve1. The fourth embodiment as described above can also provide the same effects as those of the first and third embodiments, and in addition, can reduce circuit scale since the voltage generator E1 is removed and the error amplifier ERA1c having a less number of the non-inverting input pins than the error amplifier ERA1a is used.

Figure 11:
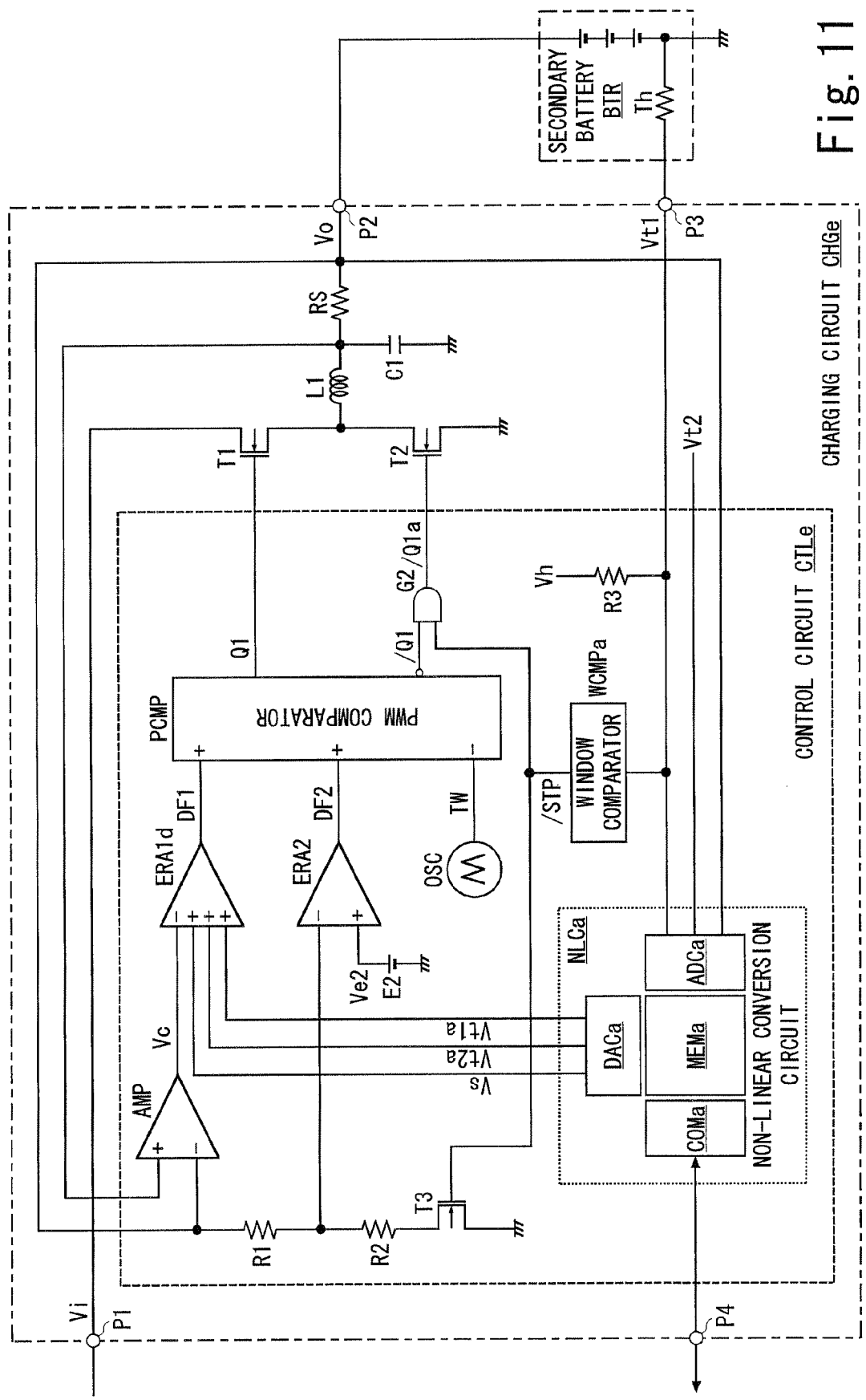
FIG. 11 is an explanatory diagram illustrating a fifth embodiment.

FIG. 11 illustrates a fifth embodiment. Hereinafter, the fifth embodiment will be described, and the same reference numerals and symbols as those used in the first to fourth embodiments are used to designate the same elements as the elements described in the first to fourth embodiments, and detailed description thereof will be omitted. A charging circuit CHGe of the fifth embodiment is structured such that in the charging circuit CHGc of the third embodiment, the control circuit CTLc is replaced by a control circuit CTLe. For example, the charging circuit CHGe is embodied by a semiconductor device and is mounted on a portable electronics device to be used for charging a secondary battery BTR. The control circuit CTLe is structured such that in the control circuit CTLc, the non-linear conversion circuit NLC and the error amplifier ERA1a are replaced by a non-linear conversion circuit NLCa and an error amplifier ERA1d.

The non-linear conversion circuit NLCa includes an A/D converter ADCa, a non-volatile memory MEMa, a D/A converter DACa, and a communication circuit COMa. The A/D converter ADCa has a first to a third channel. The first channel of the A/D converter ADCa converts a voltage Vt1 to a digital value to supply the digital value to the non-volatile memory MEMa. The second channel of the A/D converter ADCa converts a voltage Vt2 to a digital value to supply the digital value to the non-volatile memory MEMa. The third channel of the A/D converter ADCa converts an output voltage Vo (a charging voltage of the secondary battery BTR) to a digital value to supply the digital value to the non-volatile memory MEMa.

The non-volatile memory MEMa has a first to a third memory section. The first memory section of the non-volatile memory MEMa receives, as an address, the digital value supplied from the first channel of the A/D converter ADCa, and reads the digital value stored in the address to supply the read digital value to the D/A converter DACa. The second memory section of the non-volatile memory MEMa receives, as an address, the digital value supplied from the second channel of the A/D converter ADCa and reads the digital value stored in the address to supply the read digital value to the D/A converter DACa. The third memory section of the non-volatile memory MEMa receives, as an address, the digital value supplied from the third channel of the A/D converter ADCa and reads the digital value stored in the address to supply the read digital value to the D/A converter DACa.

The D/A converter DACa has a first to a third channel. The first channel of the D/A converter DACa converts the digital value supplied from the first memory section of the non-volatile memory MEMa to an analog voltage to output the analog voltage as a voltage Vt1a. The second channel of the D/A converter DACa converts the digital value supplied from the second memory section of the non-volatile memory MEMa to an analog voltage to output the analog voltage as a voltage Vt2a. The third channel of the D/A converter DACa converts the digital value supplied from the third memory section of the non-volatile memory MEMa to an analog voltage to output the analog voltage as a voltage Vs.

The communication circuit COMa, which is formed by using a serial interface or the like (for example, IIC), is capable of communicating with an external device via a pin P4 and rewrites the digital values stored in the first to third memory sections of the non-volatile memory MEMa according to a request from the external device. Incidentally, in the non-linear conversion circuit NLCa, the digital values stored in the first to third memory sections of the non-volatile memory MEMa are set so that the voltages Vt1a, Vt2a, Vs supplied from the D/A converter DACa become lower than the reference voltage Ve1.

The error amplifier ERA1d receives the voltage Vt1a at a first non-inverting input pin, receives the voltage Vt2a at a second non-inverting input pin, receives the voltage Vs at a third non-inverting input pin, and receives the voltage Vc at an inverting input pin. The error amplifier ERA1d amplifies a voltage difference of the lowest one of the voltages of the first to third non-inverting input pins from the voltage of the inverting input pin to generate an output signal DF1. That is, the error amplifier ERA1d amplifies a voltage difference of the lowest one of the voltage Vt1a, the voltage Vt2a, and the voltage Vs from the voltage Vc to generate the output signal DF1. The fifth embodiment as described above can also provide the same effects as those of the first to fourth embodiments.

The first to fifth embodiments describe the examples where the charging circuit is embodied by the semiconductor device, but for example, the charging circuit may be embodied by a module (a printed-circuit board or the like). Further, the first to fifth embodiments describe the examples where the present embodiment is applied to the case in which the charging circuit and the secondary battery are separately mounted on the portable electronics device, but for example, the present embodiment may be applied to a case in which a secondary battery pack including the charging circuit and the secondary battery is mounted on the portable electronics device.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A power supply circuit for charging a secondary battery by a DC-DC converter using a switching element and an inductance element, the power supply circuit comprising:
   a current adjustment circuit for adjusting a charging current of the secondary battery by turning on/off the switching element according to a voltage difference of a lower one of a reference voltage and a first control voltage corresponding to a temperature of the secondary battery from a current detection voltage corresponding to the charging current of the secondary battery; and
   a conversion circuit for converting the first control voltage according to a conversion rule that is changeable by an external device, and for outputting the converted first control voltage to the current adjustment circuit as a substitute for the first control voltage.

2. A power supply circuit according to claim 1, wherein the current adjustment circuit uses a second control voltage corresponding to a temperature of the power supply circuit and a third control voltage which is set to one of a voltage higher than the reference voltage and a voltage lower than the reference voltage according to a charging voltage of the secondary battery, and turns on/off the switching element according to a voltage difference of a lowest one of the reference voltage and the first to third control voltages from the current detection voltage.

3. The power supply circuit according to claim 1, further comprising:
   a non-linear conversion circuit non-linearly converting the first control voltage according to a predetermined conversion rule to generate a first converted control voltage, wherein
   the current adjustment circuit uses the first converted control voltage instead of the first control voltage.

4. The power supply circuit according to claim 3, wherein the voltage generated by the non-linear conversion circuit is set lower than the reference voltage; and the current adjustment circuit excludes the reference voltage from voltages to be used.

5. The power supply circuit according to claim 4, wherein
the non-linear conversion circuit generates a second and a third converted control voltage by non-linearly converting a second control voltage corresponding to a temperature of the power supply circuit and a charging voltage of the secondary battery according to a predetermined conversion rule; and
the current adjustment circuit uses the second and third converted control voltages in addition to the first converted control voltage, and turns on/off the switching element according to a voltage difference of a lowest one of the first to third converted control voltages from the current detection voltage.

6. The power supply circuit according to claim 3, wherein
the non-linear conversion circuit includes a conversion rule changing circuit changing the conversion rule according to the secondary battery.

7. The power supply circuit according to claim 6, wherein
the conversion rule changing circuit changes the conversion rule by using a communication circuit communicating with an external device.

8. A power supply control circuit applied in a power supply circuit for charging a secondary battery by a DC-DC converter using a switching element and an inductance element, the power supply control circuit comprising:
a current adjustment circuit for adjusting a charging current of the secondary battery by turning on/off the switching element according to a voltage difference of a lower one of a reference voltage and a first control voltage corresponding to a temperature of the secondary battery from a current detection voltage corresponding to the charging current of the secondary battery; and
a conversion circuit for converting the first control voltage according to a conversion rule that is changeable by an external device, and for outputting the converted first control voltage to the current adjustment circuit as a substitute for the first control voltage.

9. The power supply control circuit according to claim 8, wherein
the current adjustment circuit uses, in addition to the reference voltage and the first control voltage, a second control voltage corresponding to a temperature of the power supply circuit and a third control voltage which is set to one of a voltage higher than the reference voltage and a voltage lower than the reference voltage according to a charging voltage of the secondary battery, and turns on/off the switching element according to a voltage difference of a lowest one of the reference voltage and the first to third control voltages from the current detection voltage.

10. The power supply control circuit according to claim 8, further comprising:
a non-linear conversion circuit non-linearly converting the first control voltage according to a predetermined conversion rule to generate a first converted control voltage, wherein
the current adjustment circuit uses the first converted control voltage instead of the first control voltage.

11. The power supply control circuit according to claim 10, wherein
the voltage generated by the non-linear conversion circuit is set lower than the reference voltage; and
the current adjustment circuit excludes the reference voltage from voltages to be used.

12. The power supply control circuit according to claim 11, wherein the non-linear conversion circuit generates a second and a third converted control voltage by non-linearly converting a second control voltage corresponding to a temperature of the power supply circuit and a charging voltage of the secondary battery according to a predetermined conversion rule; and
the current adjustment circuit uses the second and third converted control voltages and turns on/off the switching element according to a voltage difference of a lowest one of the first to third converted control voltages from the current detection voltage.

13. The power supply control circuit according to claim 10, wherein
the non-linear conversion circuit includes a conversion rule changing circuit changing the conversion rule according to the secondary battery.

14. The power supply control circuit according to claim 13, wherein
the conversion rule changing circuit changes the conversion rule by using a communication circuit communicating with an external device.

15. A power supply control method applied in a power supply circuit for charging a secondary battery by a DC-DC converter using a switching element and an inductance element, the method comprising:
adjusting a charging current of the secondary battery by turning on/off the switching element according to a voltage difference of a lower one of a reference voltage and a first control voltage corresponding to a temperature of the secondary battery from a current detection voltage corresponding to a charging current of the secondary battery;
converting the first control voltage according to a conversion rule that is changeable by an external device; and
using the converted first control voltage as a substitute for the first control voltage in adjusting the charging current of the secondary battery.

16. The power supply control method according to claim 15, wherein
a second control voltage corresponding to a temperature of the power supply circuit and a third control voltage which is set to one of a voltage higher than the reference voltage and a voltage lower than the reference voltage according to a charging voltage of the secondary battery are used, and the switching element is turned on/off according to a voltage difference of a lowest one of the reference voltage and the first to third control voltages from the current detection voltage.

17. The power supply control method according to claim 15, further comprising:
non-linearly converting the first control voltage according to a predetermined conversion rule to generate a first converted control voltage, wherein
the first converted control voltage is used instead of the first control voltage.

18. The power supply control method according to claim 17, wherein
the voltage generated by the non-linear conversion operation is set lower than the reference voltage; and
the reference voltage is excluded from voltages to be used.

19. The power supply control method according to claim 18, wherein
a second and a third converted control voltage are generated by non-linearly converting a second control voltage corresponding to a temperature of the power supply circuit and a charging voltage of the secondary battery according to a predetermined conversion rule; and the second and third converted control voltages are used in addition to the first converted control voltage, and the switching element is turned on/off according to a voltage difference of a lowest one of the first to third converted control voltages from the current detection voltage.

20. The power supply control method according to claim 17, further comprising:

changing the conversion rule according to the secondary battery.

* * * * *